United States Patent [19]

Horii

[11] 3,995,499

[45] Dec. 7, 1976

[54] EDDY-CURRENT METER

[75] Inventor: Hirokazu Horii, Ohmiya, Japan

[73] Assignees: Nissan Motor Co., Ltd.; Kanto Seiki Company Limited, both of Japan

[22] Filed: Feb. 20, 1975

[21] Appl. No.: 551,277

[30] Foreign Application Priority Data

Feb. 26, 1974 Japan ........................ 49-22859[U]

[52] U.S. Cl. .................................... 73/519; 73/520

[51] Int. Cl.$^2$ ........................................... G01P 3/49

[58] Field of Search ........................ 73/519, 520, 2; 116/116

[56] References Cited

UNITED STATES PATENTS

| | | | |
|---|---|---|---|
| 1,067,463 | 7/1913 | Cadman | 73/520 X |
| 3,196,692 | 7/1965 | Jensen | 73/519 X |
| 3,422,683 | 1/1969 | Powell | 73/519 |

FOREIGN PATENTS OR APPLICATIONS

| | | | |
|---|---|---|---|
| 494,051 | 10/1938 | United Kingdom | 73/520 |

*Primary Examiner*—James J. Gill

*Attorney, Agent, or Firm*—Robert E. Burns; Emmanuel J. Lobato; Bruce L. Adams

[57] ABSTRACT

An eddy-current meter comprises a permanent magnet fixed for rotation with a shaft whose rotation speed is to be measured. A metal cup is disposed close to the permanent magnet and attached to a spindle carrying a pointer. The spindle is rotatable against the bias of a spiral spring. The spindle is rotatably mounted on a support bearing of the shaft. A helical compression spring is mounted insuring that the support bearing of the shaft and the journal of the spindle are axially and yieldably biased toward each other with a force the magnitude of which is adjustable. The spindle is maintained in coaxial relationship with the shaft by two axially spaced radial bearings.

5 Claims, 6 Drawing Figures

EDDY-CURRENT METER

BACKGROUND OF THE INVENTION

The present invention relates to an eddy-current meter of the type having a permanent magnet rotated by a shaft whose speed is to be measured, a metal cup close to the permanent magnet and attached to a spindle carrying a pointer. The spindle is rotatable against the bias of a spiral spring, the pointer being associated with a calibrated scale or dial. The eddy-current meter is usable as a tachometer or speedmeter.

In an eddy-current meter of the above type, as the permanent magnet revolves, eddy currents are produced in the metal cup. The magnetic fields caused by these eddy currents produce a torque, which acts in a direction to resist the turning magnetic field. The metal cup will turn against the spiral spring, in the direction of the rotating-magnetic field, and will turn (or be dragged) until the torque developed by the eddy currents equals that of the spiral spring.

A conventional eddy-current meter of the above type has a spindle carrying a pointer mounted with an axial end play. This end play is apt to cause variation of the distance between the metal cup and the permanent magnet hence there is variation of the torque applied to the metal cup when the meter is installed in a vehicle that takes varying positions from the vertical. Thus correct indication by the pointer is hardly possible when the meter is installed in such vehicle. To eliminate the axial end play, it has been proposed to arrange a plate spring over a dial to exert an axial force on the spindle. However, the arrangement detracts from the appearance of the dial, and means for adjusting the axial force makes construction of the meter complicated.

SUMMARY OF THE INVENTION

Accordingly it is an object of the present invention to provide an eddy-current meter of the type having a permanent magnet rotated by a shaft whose speed is to be measured, a metal cup close to the permanent magnet, attached to a staff carrying a pointer, pivoted and free to turn against a spiral spring, in which a helical compression spring is arranged such that the staff and the shaft are axially and yieldably biased toward each other with a force the magnitude of which is adjustable, and the staff is concentric with the shaft by two axially spaced bearings.

Another object of the present invention is to provide an eddy-current meter of the above character which is simple in construction and in which appearance of the dial is not detracted therefrom.

BRIEF DESCRIPTION OF THE DRAWINGS

Other objects, features and advantages of the present invention will become more apparent from the following description of two preferred embodiments according to the present invention, in which.

DESCRIPTION OF THE PREFERRED EMBODIMENTS

Figure 1:
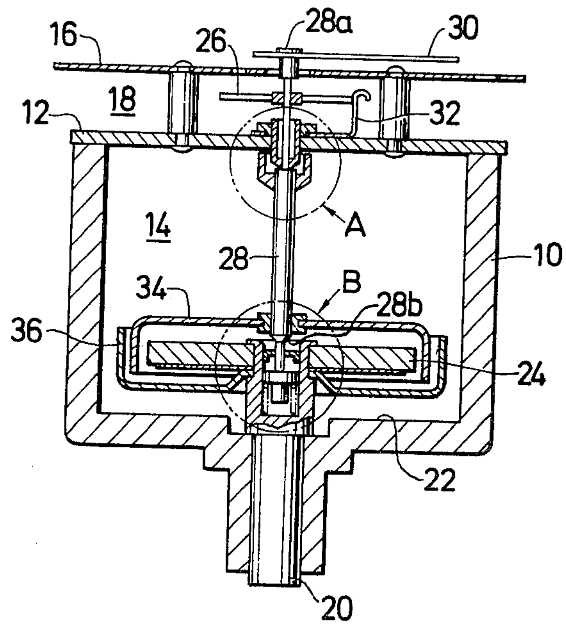
FIG. 1 is a longitudinal sectional view of one embodiment of an eddy-current meter in accordance with the invention.

An eddy-current meter shown in FIG. 1 is widely used for automobile tachometers and speedmeters. It includes a frame 10 and a bridge 12 to form a container space 14 therebetween. A dial or calibrated scale 16 is spaced from the bridge 12 and attached thereto to provide a space 18 therebetween. A shaft 20 whose revolution speed is to be measured in mounted in the bottom 22, which is spaced from the bridge 12, for free rotation relative thereto. The shaft 20 has one axial end extending into the space 14, and a permanent magnet 24 is disposed in the space 14 and attached to the shaft 20 to be rotated thereby in a plane normal to the axis of the shaft 20. A spiral spring 26 is disposed in the space 18 between the dial 16 and the bridge 12. A spindle 28 extends through the bridge 12 and the dial 16 and has one axial end 28a extending above the dial 16 and it carrys a pointer 30. The spindle 28 at the opposite axial end 28b from the axial end 18a is mounted for rotation against the force of the spiral spring 26 coaxially relative to the shaft 20. The spiral spring 26 is attached at one end to the spindle 28 and at the other end retained by a spring retainer 32 to bias the pointer 30 toward the zero index (not shown) on the dial 16. A cup 34 is attached to the spindle 28 and arranged close to the permanent magnet 24 such that the permanent magnet 24 is located in the metal cup 34 and spaced a predetermined therefrom distance. The metal cup 34 is located in an induction field cup 36 attached to the shaft 20 to be rotated thereby.

Figure 2:
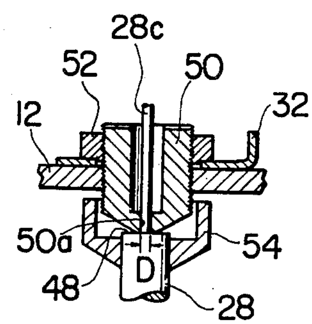
FIG. 2 is an enlarged view of the details in the circle marked A in FIG. 1.
Figure 3:
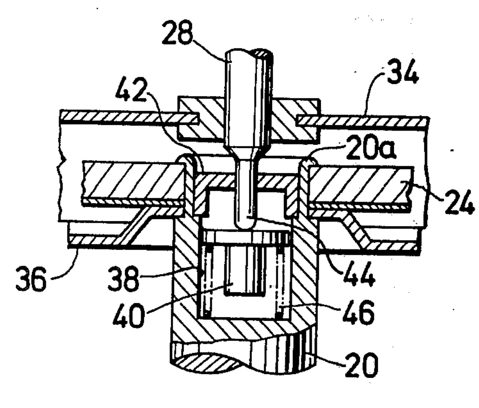
FIG. 3 is an enlarged view of the details in the circle marked B in FIG. 1.

Referring to FIGS. 2 and 3 various features of the present invention will be mentioned. As shown in FIG. 3 the shaft 20 has an axial bore 38 opening at axial end 20a, a support bearing 40 is disposed slidably in the axial bore 38 and a radial bearing 42 is fixed in the axial bore 38. A journal 44 formed at the opposite axial end 28b of the spindle 28 from the axial end 28*a* (see FIG. 1) is radially supported by the radial bearing 42 of the shaft 20, and the spindle 28 is rotatable on the support bearing 40. A helical compression spring 46 trapped in the axial bore 38 between the bottom of the axial bore 38 and the support bearing 40 yieldably biases the support bearing 40 toward the journal 44 of the spindle 28. The spindle 28 is formed with a shoulder 48 at the intermediate position or portion between its axial ends 28a and 28b, the shoulder 48 being directed toward the axial end 28a of the spindle 28, as best shown in FIG. 2. The spindle 28 extends through a sleeve 50 which is screwed into a tapped hole in the bridge 12. The sleeve 50 is axially adjustable with respect to the shaft, toward and away from the axial end 20*a* of the shaft 20 by turning the sleeve 50. A lock nut 52 on the sleeve 50 holds the spring retainer 32 in the required position. The sleeve 50 is formed with a radial bearing 50*a* which radially supports a reduced diameter portion 28*c* of the spindle 28. The radial bearing 50a integral with the sleeve 50 is tapered toward the shoulder 48, and the tapered portion abuts against the shoulder 48 to stop axial movement or thrust of the spindle 28 under the effect of the helical compression spring 46 in the direction toward the radial bearing 50a. Designated by the reference numeral 54 is a container for a damper oil by which oscillation of the spindle 28 upon its rotation is effectively damped.

The operation of the eddy-current meter described in the preceding is now described.

As the permanent magnet 24 revolves, eddy currents are produced in the metal cup 34. The magnetic fields caused by these eddy currents produce a torque, which acts in a direction to resist the rotating magnet field. The metal cup 34 then turns against the spiral spring 26, in the direction of the rotating-magnet field, and is turned or dragged until the torque developed by the eddy currents equals that of the spiral spring 26. The spiral spring 26 biases the pointer 30 toward zero index. The faster the permanent magnet 24 rotates, the greater is the movement of the pointer 30 so that it indicates the higher revolution speed.

Since in the eddy-current meter shown in FIGS. 1-3 the shoulder 48 is yieldably biased to abut against the tapered end of the radial bearing 50a under the effect of the helical compression spring 46 trapped in the axial bore 38 of the shaft 20 in order that the support bearing 40 of the shaft 20 and the journal 44 of the spindle 28 are axially and yieldably biased toward each other, the axial distance between the permanent magnet 24 and the metal cup 34 will not change even if the meter takes any positions inclined from the vertical.

The magnitude of the force with which the support bearing 40 and the journal 44 are biased toward each other can be adjusted by turning the sleeve 50 with a suitable tool.

It will be understood that the magnitude of the friction torque of the staff 28 upon its rotation is small and negligible in practical use, because the diameter D (see FIG. 2) of the reduced diameter portion 28c is small and the radial bearing 50a is tapered in the direction of the shoulder 48.

It will also be understood that since the axial distance between the permanent magnet 24 and the metal cup 34 is adjustable, slight adjustment or correction of the pointer 30 is possible.

Figure 4:
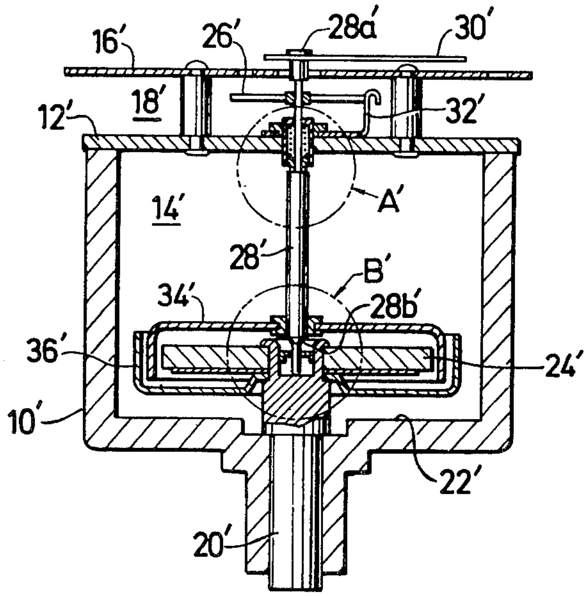
FIG. 4 is a longitudinal sectional view of another embodiment of an eddy-current meter in accordance with the invention.
Figure 5:
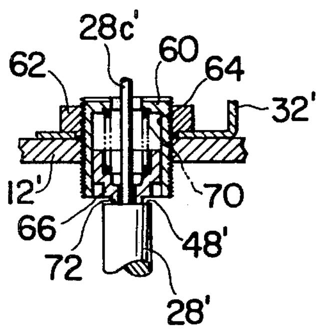
FIG. 5 is an enlarged view of the details in the circle marked A' in FIG. 4.
Figure 6:
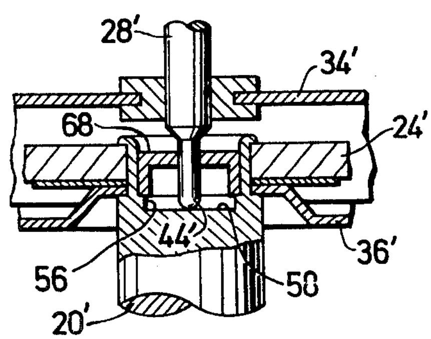
FIG. 6 is an enlarged view of the details in the circle marked B' in FIG. 4.

Referring now to FIGS. 4–6 another embodiment of an eddy-current meter illustrated is substantially similar to that illustrated in FIGS. 1–3 except for the details in the circle marked A' in FIG. 4 and the details in the circle marked B' in FIG. 4. Thus the same reference numerals are used throughout FIGS. 4–6 to designate corresponding parts to those shown in FIGS. 1–3 but they are with dashes, respectively. The description of the corresponding parts of the eddy-current meter shown in FIG. 4 is omitted in the following for the sake of simplicity of description.

The eddy-current meter shown in FIGS. 4–6 is different from that shown in FIG. 1–3 in the following respects.

Referring particularly to FIG. 5 and 6, a shaft 20' has formed in its end an axial bore 56 whose end wall 58 defines a fixed support bearing for the journal 44'. A sleeve 60 is screwed through a tapped hole in a bridge 12', the sleeve 60 being adjustably movable toward and away from the shaft 20', has an axial hole 64 and a radial bearing 66 in the axial hole 64 (see FIG. 5). A radial bearing 68 which radially supports a journal 44' of a spindle 28', is integral with the shaft 20' at the opening end portion of the axial bore 56. The radial bearing 66 is slidably disposed in the axial hole 64 of the sleeve 60 and is yieldably biased against a shoulder 48' of the spindle 28' by a helical compression spring 70. The radial bearing 66 which radially supports a reduced diameter portion **28*c*' of the spindle 28' has formed at the adjacent end to the shoulder 48' a reduced diameter collar 72. The helical compression spring 70 is trapped in the axial hole 64 to yieldably bias the radial bearing 66 toward the shoulder 48' to maintain abutting contact of the reduced diameter collar 74 with the shoulder 48'. It will be noted that the spindle 28' is axially biased downwardly as viewed in FIG. 4 so that the journal 44' and the fixed support bearing 58 are axially biased toward each other with a force exerted by the helical compression spring 70. The force is adjustable by turning the sleeve 60 which is maintained in the required position by a lock nut 62. In this embodiment friction torque of the staff 28' is negligible because contact area of the reduced diameter collar 72 with the shoulder 48'** is made small.

It will now be understood from the preceding description of the two preferred embodiments of the present invention that the adjustable axial force on the spindle 28 or 28' under the influence of the helical compression spring 46 or 70 eliminates any end play which otherwise would occur.

It will also be understood that frictional torque between the shoulder 48 or 48' and the radial bearing **50*a* or 66 due to the axial force exerted by the helical compression spring 46 or 70** is small and thus negligible in practical use.

It will be appreciated that the construction of the eddy-current meters described in the preceding description eliminates parts necessary for exerting the axial biasing force from appearing at the dial 16 or 16' and thus the beauty of the dial is not spoiled. It will also be appreciated that the construction is simple and easy to manufacture, assemble and adjust, and thus is appropriate in practical use.

What is claimed is:

1. In an eddy-current meter:

a shaft whose rotation speed is to be measured;

a support bearing coaxial with said shaft;

a permanent magnet fixed for rotation with said shaft;

a spindle carrying a pointer, said spindle having a journal formed at one end, a reduced diameter portion at an opposite end and a shoulder formed intermediate said one end and the opposite end;

said spindle being mounted rotatable on said support bearing with said journal;

a first radial bearing fixed to said shaft to radially support said spindle at a portion adjacent said journal;

a metal cup close to said permanent magnet and attached to said spindle;

a second radial bearing axially spaced from said first radial bearing radially supporting said reduced diameter portion of said spindle, said second radial bearing having a reduced diameter end rotatably abutting against said shoulder of said spindle;

said second radial bearing axially spaced from said first radial bearing with respect to said shaft being disposed to maintain said spindle in concentric relationship with said shaft;

a sleeve axially adjustable with respect to said shaft, said sleeve carrying said second radial bearing; and a spring biasing said support bearing of said shaft and said journal of said spindle axially and yieldably toward each other.

2. An eddy-current meter as claimed in claim 1, in which said shaft has an axial bore opening at one axial end thereof, said support bearing being slidably disposed in said axial bore, and said spring being positioned between the bottom of said axial bore and said support bearing to yieldably bias said spindle against said second radial bearing.

3. An eddy-current meter as claimed in claim 1, in which said second radial bearing is disposed slidably within said sleeve and said spring is mounted in said sleeve to yieldably bias said second radial bearing axially against said shoulder 4. In an eddy-current meter:

a shaft whose rotation speed is to be measured, said shaft having an axial bore opening at one axial end thereof;

a permanent magnet fixed for rotation with said shaft;

a support bearing disposed slidable in said axial bore;

a spindle having a journal formed at one end, a reduced diameter portion at the opposite end and a shoulder formed intermediate said one end and the opposite end;

said spindle being disposed rotatable on said support bearing with said journal;

a first radial bearing fixed in said axial bore to radially support said spindle at a portion adjacent said journal;

a metal cup close to said permanent magnet and attached to said spindle;

a sleeve axially adjustable with respect to said shaft;

a second radial bearing integral with said sleeve to radially support said reduced diameter portion of said spindle, said second radial bearing having a tapered end rotatably against said shoulder of said spindle;

a spring within said axial bore to yieldably bias said support bearing toward said journal of said spindle; and a container fixed for rotation with said spindle, said container surrounding said shoulder of said spindle and said second radial bearing and containing an oil therein to dampen oscillation of said spindle with respect to said sleeve.

5. In an eddy-current meter:

a shaft whose rotation speed is to be measured, said shaft having an axial bore opening at one axial end thereof, an end wall of said axial bore defining a fixed support bearing;

a permanent magnet fixed for rotation with said shaft;

a spindle having a journal formed at one end, a reduced diameter portion at the opposite end and a shoulder formed intermediate said one end and the opposite end;

said spindle being rotatable on said fixed support bearing with said journal;

a first radial bearing fixed in said axial bore to radially support said spindle at a portion adjacent said journal;

a metal cup close to said permanent magnet and attached to said spindle;

a sleeve axially adjustable with respect to said shaft;

a second radial bearing disposed slidably within said sleeve, said second radial bearing radially supporting said reduced diameter portion of said spindle, said second radial bearing having a reduced diameter end rotatably abutting against said shoulder of said spindle; and a spring within said sleeve to yieldably bias said second radial bearing toward said shoulder of said spindle.

* * * * *